United States Patent

Takeuchi

Patent Number: 5,331,768
Date of Patent: Jul. 26, 1994

[54] DOOR SEAL DEVICE

[75] Inventor: Norio Takeuchi, Hiroshima, Japan

[73] Assignee: Nishikawa Rubber Co., Ltd., Hiroshima, Japan

[21] Appl. No.: 27,144

[22] Filed: Mar. 5, 1993

[30] Foreign Application Priority Data

Mar. 11, 1992 [JP] Japan .................. 4-088028

[51] Int. Cl.⁵ ............................. E06B 7/16
[52] U.S. Cl. ................. 49/493.1; 49/475.1
[58] Field of Search ........... 49/475.1, 490.1, 493.1, 49/495.1, 484.1

[56] References Cited

U.S. PATENT DOCUMENTS

| | | | |
|---|---|---|---|
| 4,277,099 | 7/1981 | Klein et al. | 49/484.1 X |
| 4,494,790 | 1/1985 | Omura | 49/484.1 X |
| 4,934,101 | 6/1990 | Hannya et al. | 49/475.1 X |
| 4,945,681 | 8/1990 | Nozaki et al. | 49/495.1 |
| 5,038,521 | 8/1991 | Andrzejewski et al. | 49/484.1 X |
| 5,048,887 | 9/1991 | Kunishima et al. | 49/490.1 X |
| 5,154,952 | 10/1992 | Nozaki | 49/495.1 X |
| 5,209,019 | 5/1993 | Morita | 49495.1 X/ |

Primary Examiner—Peter M. Cuomo
Assistant Examiner—Jerry Redman
Attorney, Agent, or Firm—Flynn, Thiel, Boutell & Tanis

[57] ABSTRACT

A door seal device capable of narrowing the width of the outer appearance of the door cutline seal so that it looks better and capable of preventing a noise generated at the outdoor side from entering the room whereby the room gets quiet. The door seal device according to the present invention comprises a door sash 30 having a protruding portion 33 which extends substantially perpendicularly relative to a door glass 21 and also extends to the outdoor side 15 over the upper end portion of the door glass 21, a protruding flange 35 provided on the protruding portion 33 which faces a body opening end edge 11, a reverse V-shaped protruding portion 51 attached to the protruding portion flange 35 for covering the tip end 34 of the protruding portion 33 and the protruding portion flange 35 and a main seal 60 which closely contacts the reverse V-shaped protruding portion 51 at the side of the body opening end edge 11.

7 Claims, 3 Drawing Sheets

DOOR SEAL DEVICE

BACKGROUND OF THE INVENTION

1. Field of the Invention

The present invention relates to a door seal device which is attached to a door sash and elastically contacts a body opening end edge for sealing the space between the door sash and the body.

2. Prior Art

A conventional door seal device, which is attached to a door sash and elastically contacts a body opening end edge for sealing the space between the door sash and the body, will be described with reference to FIG. 2.

A door sash or frame 70 comprises a U-shaped sideways portion 71 which faces the exterior 15 and a trapezoidal sideways protruding portion 72 which protrudes toward and faces the interior 14. Attached to the door sash 70 are a glass run 80 which elastically contacts a door glass 21, a door cutline seal 90 which functions as a stopper of the door glass 21 and has a door cutline seal lip 92 at the upper surface thereof and a core 93 at the inside thereof and a main seal 91 which elastically contacts the body opening end edge 11 at an interior portion thereof. More specifically, the glass run 80 is attached to the U-shaped sideways portion 71 by way of a retainer 73 and comprises an upper hollow portion 81 and a lower seal lip 82. An upper flange 74 of the U-shaped sideways portion 71 is engaged in the door cutline 90 and the main seal 91 is attached to the upper surface of the trapezoidal sideways protruding portion 72 by way of a retainer 75. A molding 61 is attached to the body opening end edge 11 so as to cover an outer flange 12 of the body 10 and elastically contacts the door cutline seal lip 92. A subsidiary seal (hereinafter referred to as a sub-seal) 62 elastically contacts the surface of the trapezoidal sideways protruding portion 72 at an interior facing surface thereof and is integrated with a U-shaped inner side trim 63 having a core 64. An inner flange 13 is engaged in the inner trim 63.

From a designing point of view, it is required by the car that the outer appearance of the door cultline seal 90 extending from the upper end of the door glass 21 to the opening end edge 11 of the body 10 looks narrow. However, according to the conventional door seal device as illustrated in FIG. 2, it is difficult to narrow the width F of the outer appearance of the door cultline seal 90 since the upper flange 74 of the door sash 70 is used as the stopper of the door glass 21 and it is engaged in the door cutline seal 90 having the door cutline seal lip 92. As a result, the door cutline seal 90 looks poor.

SUMMARY OF THE INVENTION

It is therefore an object of the present invention to provide a door seal device capable of narrowing the width of the outer appearance of the door cutline seal so that it looks better and is capable of preventing a noise generated at the exterior from entering the interior of the body whereby the interior gets quiet.

To achieve the above object, the door seal device according to the present invention comprises a door sash or frame 30 having a protruding portion 33 which extends substantially perpendicularly relative to a door glass 21 and also extends toward the exterior 15 over the upper end portion of the door glass 21, a protruding flange 35 provided on the protruding portion 33 which faces a body opening end edge 11, an inverted V-shaped protruding portion 51 attached to the protruding flange 35 for covering the tip end 34 of the protruding portion 33 and the protruding flange 35 and a main seal 60 which closely contacts the inverted V-shaped protruding portion 51 at the side of the body opening end edge 11.

PREFERRED EMBODIMENT OF THE INVENTION

Figure 1:
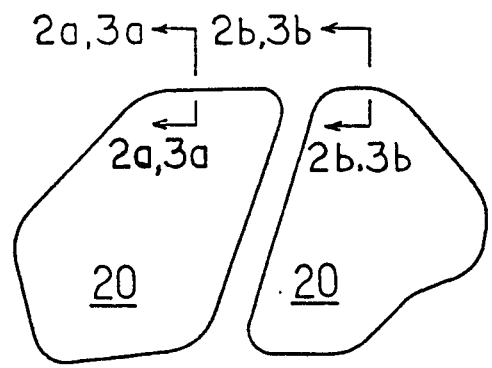
FIG. 1 is a side view of a skeleton of a door seal device of a car.
Figure 2:
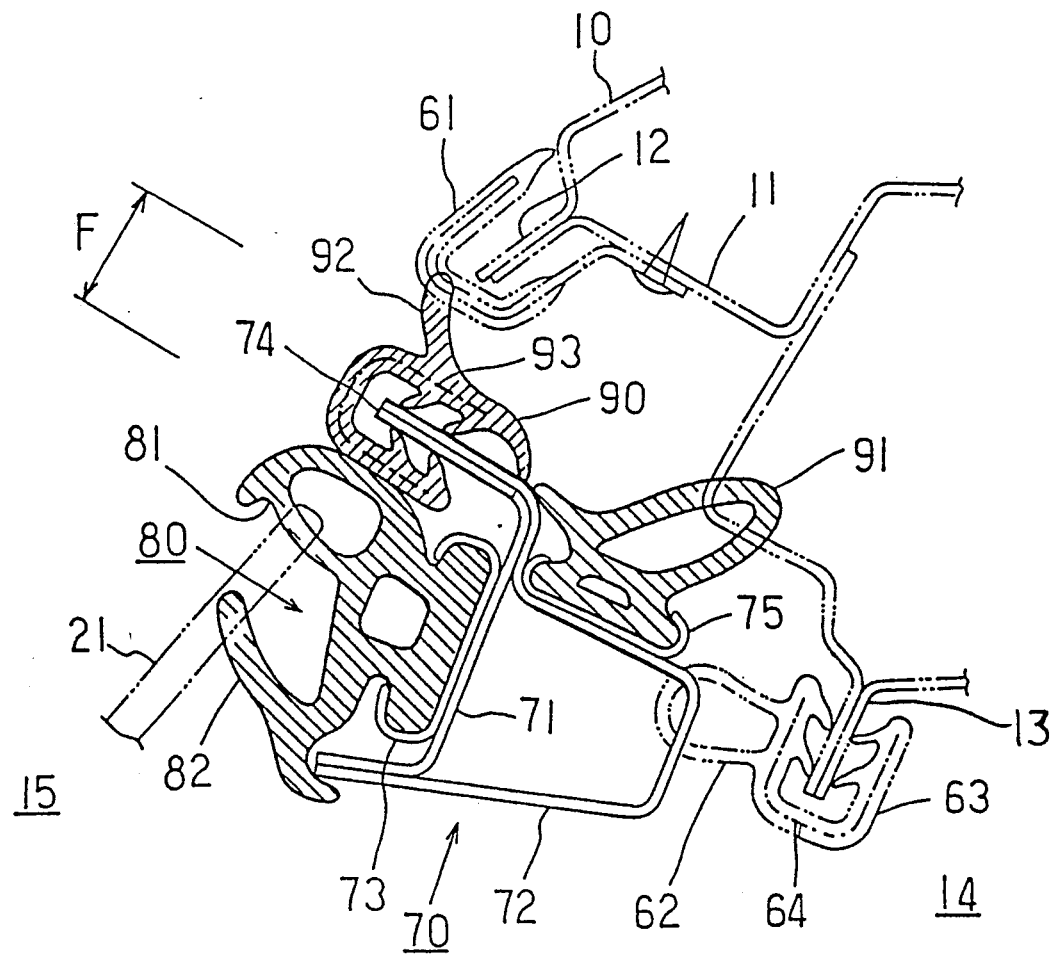
FIG. 2 is a cross-sectional view of a conventional door seal device taken along the sectional lines 2a—2a and 2b—2b of FIG. 1.

A door sash or frame 30 comprises a U-shaped sideways portion 31 which faces and opens toward the exterior 15, a trapezoidal sideways protruding portion 32 which protrudes toward the interior 14 and a protruding flange 35 which is attached to the substantially upper half portion of the trapezoidal sideways protruding portion 32 so as to cover the upper surface of the door sash 30 and which is bent aslant upward toward the interior 14 wherein the U-shaped sideways portion 31 is engaged in the inside of the trapezoidal sideways protruding portion 32 and wherein the overlapping portions between the U-shaped sideways portion 31, the trapezoidal sideways protruding portion 32 extend perpendicularly to a door glass 21 and extend toward the exterior side 15.

A glass run 40 elastically contacts the door glass 21 and comprises a base portion 41 which is attached to the U-shaped sideways portion 31 of the door sash 30 by way of a retainer 36, a lower seal lip 42 which is integrated with a lower tip end of the base portion 41 and a hollow seal portion 43 which is integrated with an upper portion of the base portion 41.

A door cutline seal 50 extends continuously inwardly to an inverted V-shaped protruding portion 51 so as to be integrated therewith and has a door cutline seal lip 52 which protrudes therefrom toward the exterior side 15. The reverse V-shaped protruding portion 51 extends over the protruding flange 35 and is bent aslant upward so as to extend to a given length and successively bent aslant downward so as to extend to a given length and reach the end of the upper portion of the trapezoidal sideways protruding portion 32. The inverted V-shaped protrusion portion 51 is attached to the protruding flange 35 by a screw bolt 37.

The inverted V-shaped protruding portion 51 is allowed to elastically contact a main seal 60 which is attached to a body opening end edge 11. The door cutline seal lip 52 is allowed to elastically contact a molding 61 which is attached to the body opening end edge 11 at the exterior side 15. The door cutline seal 50 is bent downward at the exterior side 15 so as to cover the tip end 34 of the protruding portion or flange 33 of the door sash 30.

Figure 3:
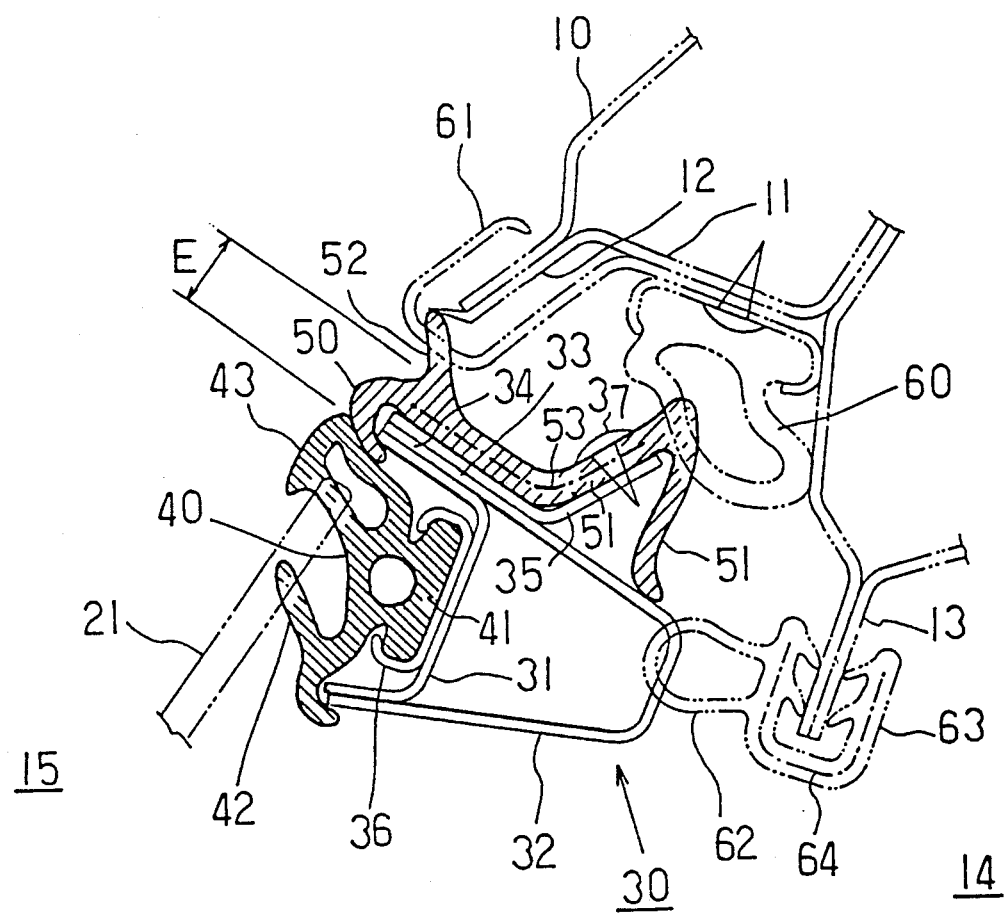
FIG. 3 is a cross-sectional view of a door seal device according to the present invention which is taken along 3a—3a and 3b—3b of FIG. 1.
Figure 4:
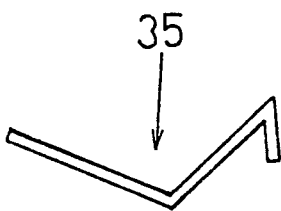
FIG. 4 is a cross-sectional view of another example of a protruding flange of the door seal device according to the present invention.
Figure 5:
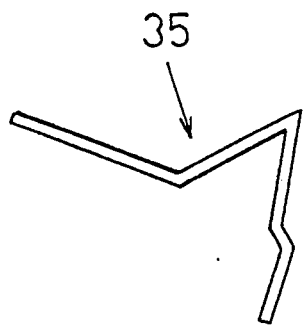
FIG. 5 is a cross-sectional view of still another example of a protruding flange of the door seal device according to the present invention.

The protruding flange 35 has a V-shape in FIG. 3 as viewed from the room side 14. However, it may have an inverted V-shape in FIG. 4 as viewed from the room side 14 and the inverted V-shape in FIG. 5 same as that in FIG. 4 wherein in the latter the tip of the protruding flange 35 extends further along the surface of the trapezoidal sideways protruding portion 32 along the interior side 14 of the car.

A sub-seal 62 elastically contacts the surface of the trapezoidal sideways protruding portion 32 at the interior side 14 of the car and is integrated with a U-shaped inner trim 63 having a core 64 therein. An inner flange 13 of the body 10 at the interior side 14 is engaged in the U-shaped inner trim 63.

With the arrangement of the weather seal, the shape of the door cutline seal 50 having the door cutline seal lip 52 at the upper end thereof is simplified and thinned, which results in remarkably narrowing the width E of the outer appearance thereof compared with that of the conventional door seal device. As a result, the outer appearance of the door cutline seal 50 can be improved particularly.

Furthermore, since the noise, which generates at the exterior, enters the interior by way of the door cutline seal lip 52, the main seal 60 and the sub-seal 62, namely, by way of a long route, the interior is quiet when the car travels.

What is claimed is:

1. A door seal device comprising:
    a door sash having a protruding portion which extends substantially perpendicularly relative to a door glass and also extends outwardly over an upper end portion of the door glass;
    a protruding flange provided on the protruding portion which faces a body opening end edge;
    an inverted V-shaped protruding member of a door cutline seal attached to and covering the protruding flange, the door cutline seal also having a tip end member surrounding a free end of the protruding portion; and
    a main seal attached to said body opening end edge and contacting the inverted V-shaped member at the side of the body opening end edge in a closed position of the door sash.

2. A sealing device disposed between a frame of a car door and a car body, the sealing device comprising:
    a first flange extending from an upper portion of the door frame, said first flange extending transverse to and above an upper edge of a door glass arranged adjacent to the door frame;
    a second flange inclined away from said upper portion of the door frame;
    a door cutline seal having an intermediate portion extending along said upper portion of the door frame, an outer end portion forming a lip member surrounding a free end of said first flange, and an inner end portion forming an inverted V-shaped member having a first wall extending along said second flange and a second wall joined to said first wall over a free end of said second flange; and
    a main seal secured to the car body and resiliently contacting said inverted V-shaped member when the car door is in a closed position.

3. The sealing device as claimed in claim 2, wherein said second flange includes an inclined tip portion extending from said free end of said second flange.

4. The sealing device as claimed in claim 2, wherein said door cutline seal further includes a second lip member extending from an upper surface of said intermediate portion, said second lip member resiliently contacting a molding member attached to the car body.

5. The sealing device as claimed in claim 2, further including a glass run seal secured to the door frame and having a hollow seal member disposed between said upper edge of said door glass and said lip member.

6. The sealing device as claimed in claim 2, wherein said first wall of said inverted V-shaped member includes means for securing said door cutline seal to said second flange.

7. The sealing device as claimed in claim 6, wherein said means for securing said door cutline seal includes at least one screw bolt.

* * * * *